United States Patent [19]

Deplante et al.

[11] Patent Number: 5,784,335
[45] Date of Patent: Jul. 21, 1998

[54] METHOD FOR MAKING A 3-D CUBE OF NEAR TRACES FROM DATA ACQUIRED IN A MARINE REFLECTION SEISMIC SURVEY

[75] Inventors: Christian Deplante, Pau; Michel Revoy, Lescar, both of France

[73] Assignee: Elf Aquitaine Production, Courbevoie, France

[21] Appl. No.: 601,945

[22] Filed: Feb. 15, 1996

[30] Foreign Application Priority Data

Feb. 16, 1995 [FR] France .................. 95 01776

[51] Int. Cl.⁶ .................. G01V 1/38; G01V 1/34
[52] U.S. Cl. .................. 367/72; 367/20; 367/21
[58] Field of Search .................. 367/20, 21, 68, 367/72

[56] References Cited

U.S. PATENT DOCUMENTS

| 5,487,052 | 1/1996 | Cordsen | 367/56 |
| 5,511,039 | 4/1996 | Flentge | 367/56 |

FOREIGN PATENT DOCUMENTS

| 2149503 | 6/1985 | United Kingdom | 367/20 |
| 2217014 | 10/1989 | United Kingdom | |
| 91/18302 | 11/1991 | WIPO | |

OTHER PUBLICATIONS

G.L. Kinsland, et al., "High–Resolution Three–Dimensional Seismic Survey of a Thin Sand at Depth", Geophysics, vol. 56, No. 12, Dec. 1991, pp. 2036–2047.

W.S. French, "Improvements in 3–D Seismic", World Oil, vol. 215, No. 5, May 1994, Houston, Texas, pp. 60–61.

W.R. Cotton, "3D Marine Seismic Survey Quality Control", Oil & Gas Journal, vol. 81, No. 36, Sep. 1983, Tulsa, Oklahoma, pp. 102, 105, 106,113 and 114.

Primary Examiner—Ian J. Lobo
Attorney, Agent, or Firm—Ostrolenk, Faber, Gerb & Soffen, LLP

[57] ABSTRACT

A method for making a 3-D cube of near traces from data acquired in a marine reflection seismic survey.

A method for making a 3-D cube of near traces using at least one source ($S_1$, $S_2$) and a plurality of streamers (4 to 7) spaced from the source, each comprising receivers/recorders ($R^1_4$, $R^1_5$, $R^1_6$, $R^1_7$) as well as means for the space tracking of each source and each streamer, the image of the subsurface being produced in three dimensions with a system of X, Y, T axes in the form of a 3-D cube by assigning to each bin of a group of bins forming a group with a regular grid in an X,Y plane, a central trace represented at the center of said bin along the time axis (T), said method being characterized in that for each line navigated, said central trace is produced from at least a first recorded trace whose offset is as close as possible to a constant offset equal to the smallest offset common to at least the group of traces of the navigated line.

6 Claims, 7 Drawing Sheets

FIG. 1
PRIOR ART

FIG_3

FIG_4

FIG_5

FIG_6

FIG_7

METHOD FOR MAKING A 3-D CUBE OF NEAR TRACES FROM DATA ACQUIRED IN A MARINE REFLECTION SEISMIC SURVEY

BACKGROUND OF THE INVENTION

The present invention relates to a method for making a subsurface image in three dimensions called a 3-D cube of near traces of data acquired in a marine reflection seismic survey, and it relates in particular to the generation of a 3-D mini-cube produced onboard a survey ship sailing in the area to be explored in a well-known configuration.

A three-dimensional or 3-D seismic survey is used in preference to a two-dimensional or 2-D marine seismic survey, to improve the lateral positioning of the reflectors on which the waves transmitted by a seismic energy source are reflected, the reflected waves being received and recorded on receivers/recorders uniformly spaced along a recording cable or streamer towed in the ship's sailing direction. 3-D marine seismic surveys also help to improve the lateral resolution in the cross-line direction to the acquisition direction given by the direction of the streamer.

In a 3-D marine seismic survey, one or a plurality of sources and a group of substantially parallel streamers are towed simultaneously, in order to acquire a plurality of seismic data lines, called acquisition lines, on a path of the ship (navigated line), each of said lines being defined by a source/streamer pair. After adequate processing, these lines serve to obtain a three-dimensional image of the subsurface, generally called a seismic cube. By using a plurality of seismic sources and a larger number of streamers, for example two or three sources and four to six streamers, a larger survey area is covered at lower cost, and the final data have increased coherence.

The nature of the seismic sources, the spacing of said sources and of the streamers, the length of each streamer which ranges between 1000 and 6000 m, the number of receivers/recorders provided on each streamer (thousands of hydrophones on hundreds of independent channels), the distance between the consecutive receivers/recorders or the group interval, are adapted to the imaging of targets located at depths of a few kilometers. The sources and receivers/recorders are provided with means for tracking them spatially so that the seismic data collected can be processed to give a geographic location accurate to less than ten meters.

The geometrical midpoints of each source/receiver pair are grouped in a grid of rectangular bins forming a regular grid is an X,Y plane, where X is preferably the reference sailing direction, and Y is the perpendicular direction to the X direction. Preferably, the bins of the grid have a spacing equal to half the group interval along the X direction, and, in the Y direction, to half of the smallest lateral distance, either between sources if a plurality of sources is present, or between streamers in their theoretical geometrical configuration. The grid of bins used dynamically is actually a static geographic grid computed once and for all before the exploration survey, by assuming the navigation of the ship and the geometry of the towed array (source(s) and streamers) to be theoretical and perfect.

For the final use of the recorded seismic data, along the processing lines in X (on-line) or in Y (cross-line) defined by the grid, it is necessary to ensure that the real-time binning of the grid of one acquisition line on the other takes place without gaps or overcoverage. However, the coordinates of the final positions of the sources and receivers are only obtained in a subsequent post-computation phase, designed to filter the positioning data more elaborately than in real time. The positions that prove to be aberrant in the subsequent are recomputed later so that, on completion of the survey, the positioning data quality is practically constant.

The final accuracy (in the range of a few meters) demanded by certain seismic data processing steps approaches the limits of the methods employed, at least with respect to the lateral positions of the sources and receivers, often less well restricted by the positioning measurements than the longitudinal positions, and subject to certain systematic biases which the positioning data alone cannot necessarily help to detect and to correct. It is principally to detect and correct these errors and these biases that the making on board of a 3-D cube of reduced common depth-point stacked seismic data was adopted, as soon as it became feasible (since 1992). The reduced multiple coverage used to obtain the near trace cube according to the prior art consists in working on the short offset traces after normal-moveout correction.

By producing, from a cube of conventionally-processed data (but in reduced coverage), time sections (FIG. 1) and cross-line sections, that is to say perpendicular to the X direction (FIG. 2), it is effectively possible to detect positioning errors, which result in time differences between the traces associated with the same navigated line or between the traces associated with adjacent navigated lines.

It is observed that, among the cubes in reduced coverage, the greatest sensitivity to positioning errors is offered by those in unit coverage using only the trace nearest to each processing line. In this case, the following two occurrences (FIG. 1) are observed in the image of the seabed or of the horizons or reflectors nearest to said seabed, for example located at 200 ms under said seabed.

Figure 1:
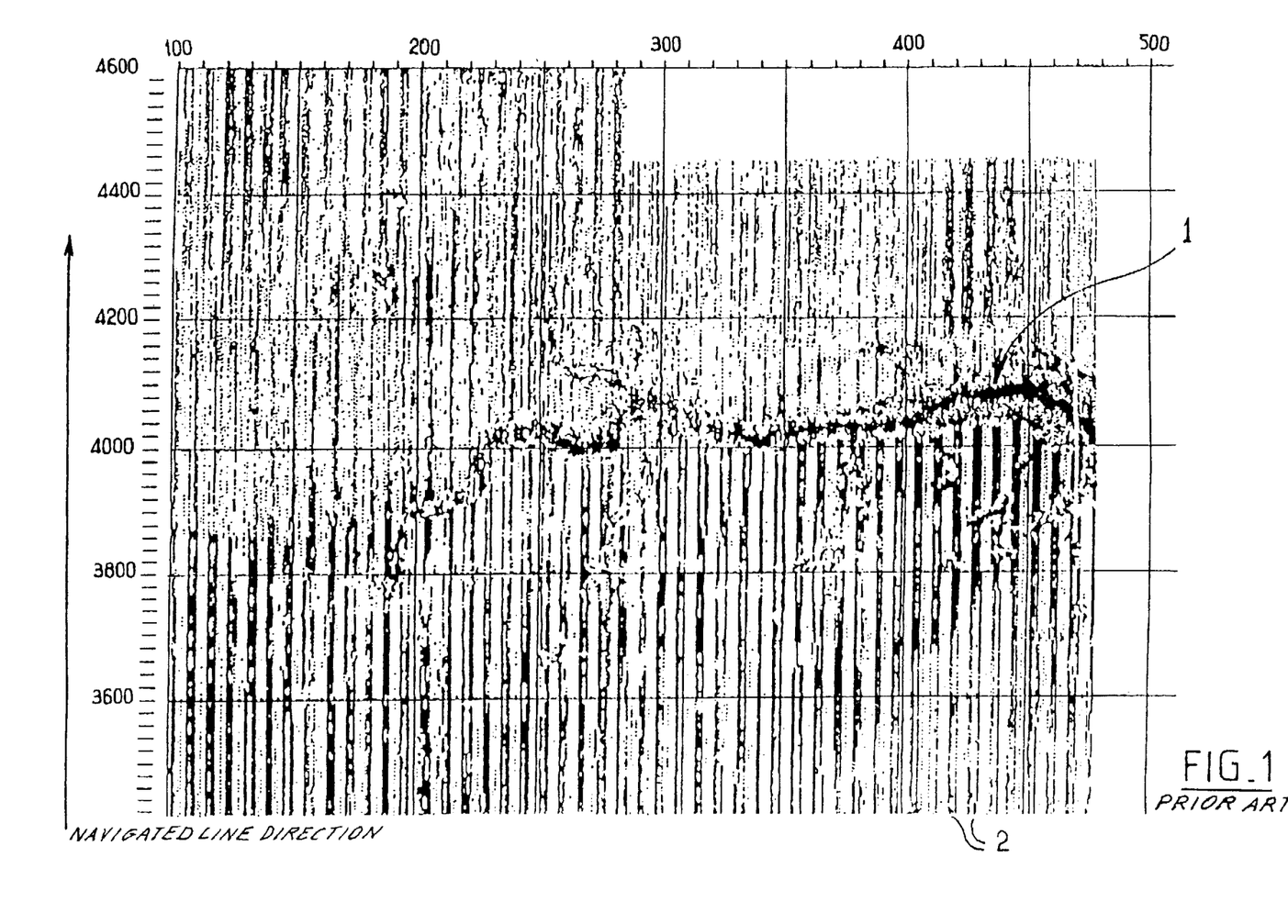
FIG. 1 is a time section (92 ms) obtained by the use of a near trace cube in unit coverage according to the prior art, showing the two occurrences which are observed for a seabed located at about 90 ms.

The first occurrence is associated with the geology of the first subsurface layers: this is the image, for example, of Quaternary paleochannels filled with sediments of higher acoustic impedance than the seabed, and denoted by the numeral 1. A higher acoustic impedance generates a higher reflection coefficient, that is to say a hard seabed effect.

The second occurrence is due to the artifacts associated with the imperfections of acquisition and processing, and it is materialized in the figure by an approximately periodic pattern in the form of bands oriented in the direction of the navigation paths, and denoted by the numeral 2.

If the coordinates used in the calculation of a near trace 3-D cube contain errors, these errors cause time differences which are also oriented in the form of bands, possibly locally periodic if systematic biases are involved.

The main portion of the periodic pattern observed is an artifact of the processing and of the utilization of the near trace 3-D cube according to the prior art. One important, if not the main cause of the artifacts is the freak differential frequency distortion resulting from the normal moveout correction between short offsets which vary from one processing or acquisition line to another. In fact, on the horizons or reflectors near the seabed, the frequency distortion is very high, and varies rapidly as a function of the offset, said offset being the distance between a source and a given receiver.

The frequency distortion effect is expressed for a homogeneous medium by the equation:

$$\frac{F'}{F} = \frac{1}{\left(1 + \frac{X}{(V \cdot T_0)^2}\right)^{1/2}}$$

where:

F is the frequency after NMO correction,

F is the frequency before NMO correction,

X is the offset for a given source/receiver pair,

V is the NMO velocity, $T_0$ is the zero source/receiver (ZSR) two-way time (source and receiver merged).

This frequency distortion effect increasing as the horizons are superficial or very close to the seabed, and as the minimum offset varies from one processing line to another on the same navigated line. In the case of marine 3-D seismic surveys, this offset variation is in fact due to a variation in the lateral offset component Y, and it increases in particular with the number of acquisition lines or streamers, at equivalent bin size.

When these effects are detected, and if their elimination is deemed necessary, the processing generally proposed consists in applying a space filter (in Kx,Ky) to the time sections, a space Fourier transform in the domain of the x and y coordinates, respectively in the direction of the streamers and in the perpendicular direction to said streamers, in order to thus perform a full space deconvolution of the occurrence.

However, this processing reduces the effect and not the cause, and it is liable to eliminate other distortions associated with positioning errors. With two sources and with a group of four streamers, a systematic bias in the position of a source or of a streamer results in a difference occurring respectively every two or every four processing lines. The normal frequency of the near offsets in this configuration is eight lines with four- and two-line space harmonics. A space filter optimized to eliminate these artifacts could accordingly reduce the capacity of the sources or streamers to detect a positioning bias.

Furthermore, like any convolution requiring a Fourier transform, undesirable edge effects occur if an incomplete cube is used. As it happens, it is during the survey, when only a very incomplete cube is available, that information is needed about the first layers of the marine subsurface.

It is possible to envisage the making onboard the ship of a final 3-D cube in complete coverage. However, this would require prohibitive onboard resources (very large data processing capability, additional and highly skilled personnel), and this is generally unjustified by the time gain anticipated in the delivery of the final result.

SUMMARY OF INVENTION

The present invention is aimed to propose a simple method which considerably diminishes the occurrence of the previously-described artifacts due to the processing of the seismic data, at least for the first layers of the marine subsurface, and which thus helps to identify the positioning errors which would otherwise have been masked by said artifacts.

The present invention relates to a method for making a 3-D cube of near traces from data acquired in a marine reflection seismic survey, of the type wherein:

a) the acquisition of said data is performed by conveying, in a reference direction D, i) at least one source, ii) a plurality of streamers spaced from the source, laterally distant from each other and each comprising receivers/recorders uniformly spaced along each streamer, and iii) means for the space tracking of each source and of each streamer, in order to obtain, simultaneously, for each navigated line, seismic data in the form of traces, delivered by the receivers/recorders, along as many acquisition lines, preferably substantially parallel to the reference direction D, as the product of the number of streamers multiplied by the number of sources used, and space tracking data for locating each source and for locating the receivers/recorders to give the distance or offset between each source and each receiver, as well as the coordinates of the midpoint of the source/(receiver/recorder) pair associated with each trace, b) a three-dimensional subsurface image is produced in a system of (X, Y, T) axes in the form of a 3-D cube by assigning to each bin of a group of bins forming a regular grid in an X,Y plane, representative of the seismic data acquisition plane, a central trace produced from the recorded traces and represented at the center of said bin along the time axis (T), said process being characterized in that, for each navigated line, the central trace of each bin is produced from at least a first recorded trace of which the associated midpoint is located in said bin and of which the offset is as near as possible to a constant offset equal to the smallest offset common to at least the group of traces of the navigated line.

One advantage of the present invention resides in the fact that, besides a substantial reduction in the occurrence of artifacts, it serves to reconstruct the first environments with greater accuracy by the near trace cube.

Another advantage is the possibly easier detection of the positioning biases of the head receivers of the streamers and/or of the sources, and of advantaging the application of subsequent, more sophisticated processings, such as 3-D DMO (dip moveout) and fine velocity analyses for prestack depth migration.

BRIEF DESCRIPTION OF THE DRAWINGS

The above and other advantages and characteristics of the present invention will appear from a reading of the method of the invention as well as the accompanying drawings wherein.

DETAILED DESCRIPTION OF THE DRAWINGS

The data acquisition array for the exploitation of the process of the invention (FIG. 3) conventionally comprises a ship 3 towing two seismic energy sources $S_1$ and $S_2$, and a group of four streamers 4 to 7, for example. The streamers 4 to 7 are assumed to move parallel to each other and are disposed symmetrically about a longitudinal axis of symmetry 8 which is substantially the travelling direction D or the path of the ship 3 (navigated line). The sources $S_1$ are also disposed symmetrically about the longitudinal axis 8. Each streamer 4 to 7 has a large number of receivers/recorders which each receive and record signals or traces which are representative of the waves transmitted by the sources $S_1$, $S_2$ and reflected by the marine subsurface-reflectors. A seismic data acquisition line is determined by the line of travel of a streamer on which the receivers are uniformly spaced. At the head of each streamer, there is a head receiver $R^1_4$, $R^1_5$, $R^1_6$, $R^1_7$, the exponent indicating the rank of the receiver and the subscripts 4, 5, 6 and 7 indicating the streamer concerned. In the example shown, the head receiver $R^1_4$ of the streamer 4 is separated from the source $S_1$ by a distance or offset of 225 m, the head receiver $R^1_5$ being at 170 m from S1, the other head receivers $R^1_6$ $R^1_7$ being respectively separated from the source $S_1$ by 151 m and 190 m. Due to the symmetry of the array, the head receivers $R^1_4$, $R^1_5$, $R^1_6$, $R^1_7$ are separated from the source $S_2$ respectively by 190, 151, 170 and 225 m.

Figure 3:
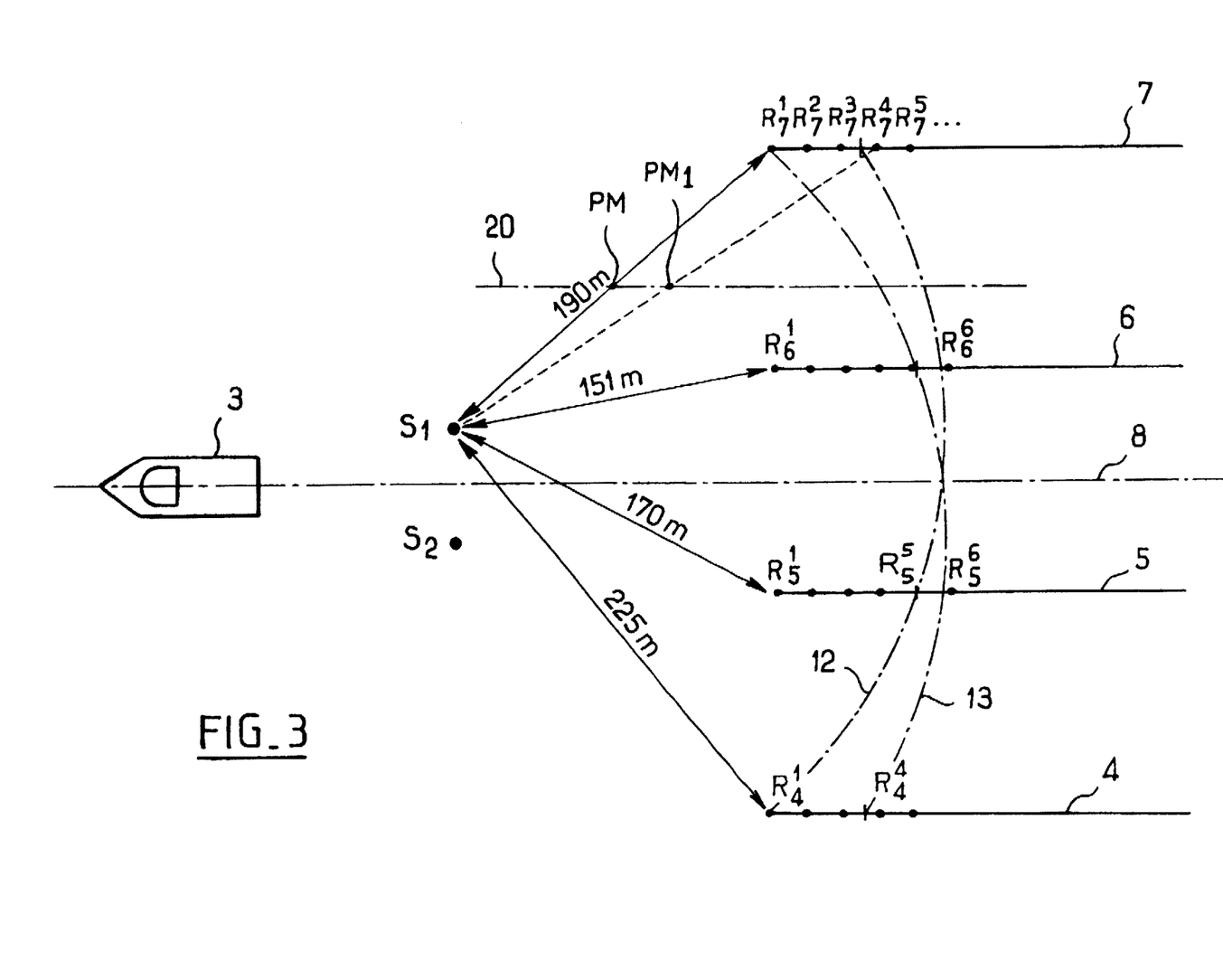
FIG. 3 is a diagrammatical plan view of a data acquisition array for the carrying into practice of the process of the invention, in marine seismic surveys.

The spacing of the sources $S_1$ and $S_2$, like the spacing between the streamers 4 to 7, is obtained using appropriate divergent angular panels in order to obtain an adequate side hydrodynamic thrust. The positioning of the sources and of the receivers is obtained first in relative terms, with respect to the ship, and then in absolute terms, by using the geographic position of the ship, determined for example by a satellite positioning system GPS (Global Positioning System), in differential mode. All these means, as well as those necessary for an accurate determination of the spatial location of the streamers, receivers and sources, are well known to specialists and are not described.

When conventional methods of marine seismic processing are used, possibly with a trace stack, well known and not described here, a time section is obtained in the cross-line direction analogous to the one shown in FIG. 2, where the traces recorded, for example, at 92, 124 and 172 ms are relatively indistinct and, in consequence, it is difficult to determine the origin of the artifacts of which one of the causes, as stated hereinabove, is the frequency distortion.

In the making of a near trace 3-D cube in a system of (X, Y, T) axes, each bin of a group of bins of the X,Y plane, representative of the seismic data acquisition plane, is assigned a central trace represented at the center of the bin considered along the time axis T.

According to the invention, the artifacts are attenuated by selecting constant-offset traces at the input of the seismic processing in order to obtain the near trace cube. To do this, a first source, $S_1$ for example, is selected, and the offset of 225 m is selected as the constant offset, a distance between the source $S_1$ and the head receiver $R^1_4$, and which represents the shortest common offset between the source $S_1$ and the different receivers of the streamers 4 to 7, or the longest of the short offsets. If an arc of circle 12 having $S_1$ as the center and $S_1R^1_4$ as the radius is traced, the arc of circle 12 theoretically intersects the streamer 5 at a point which is near to or merged with the receiver $R^5_5$, the streamer 6 in the neighborhood of the receiver $R^6_6$ and the streamer 7 in the neighborhood of the receiver $R^4_7$. In this case, to obtain the image of the near trace cube according to the invention, it may be necessary to select the recordings associated with the pairs $S_1R^1_4$, $S_1R^5_5$, $S_1R^6_6$ and $S_1R^4_7$, as the acquisition proceeds, followed by the processing of these data, and the bins filled at this stage are those containing the midpoints of the segments joining the $S_1$-receiver pairs considered, $R^1_4$, $R^5_5$, $R^6_6$ and $R^4_7$, for example, the midpoints PM and $PM_1$ of the segments $S_1R^1_7$ and $S_1R^4_7$ and the processing lines passing through these bins, such as lines 20 passing through the midpoints PM and $PM_1$.

The operation is repeated with source $S_2$ and the offset of 225 m determined by the distance $S_1R^1_7$ and representing the shortest common offset between the source $S_2$ and the different receivers of the streamers 4 to 7, which gives an arc of circle 13 which intersects the streamer 4 in the neighborhood of the receiver $R^4_4$, the streamer 5 in the neighborhood of the receiver $R^6_5$, the streamer 6 in the neighborhood of the receiver $R^5_5$, and the streamer 7 at the receiver $R^1_7$. On the single trace selected for each source/streamer pair, seismic processing is carried out, essentially amounting to a normal moveout.

With the method of the invention, it is found that the variation in the frequency distortion is decreased by a factor of about 6. In fact, the distance between two consecutive receivers on each streamer is generally 12.5 m, which is also called the group interval. Since the variation in offset, which is originally 75 m (225–150 m) is reduced to the minimum to the group interval, or 12.5 m, it is easy to find that the gain is 75/12.5=6.

Figure 2:
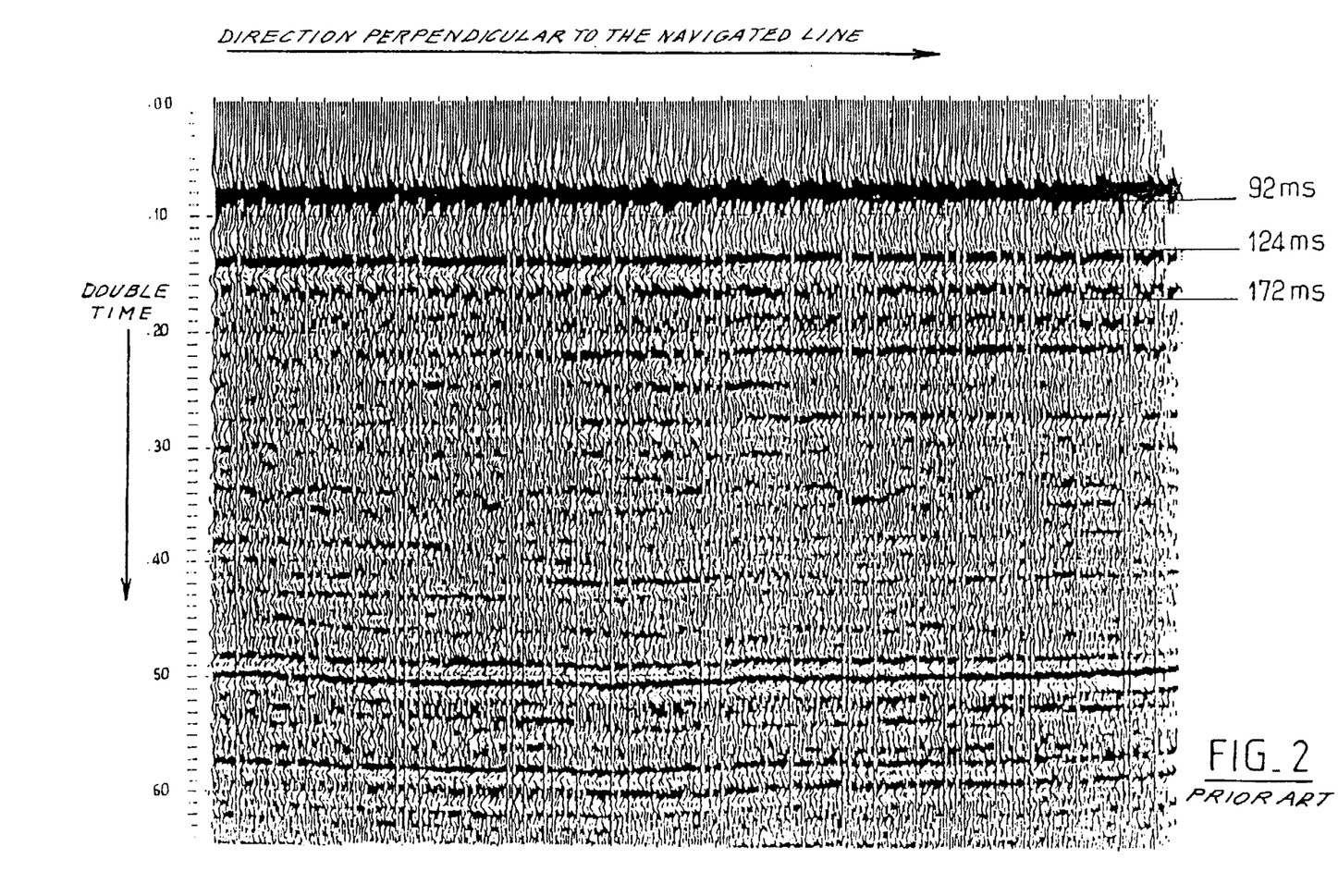
FIG. 2 is a time section in the cross-line direction to the ship's path obtained according to the prior art, by the use of the same near trace cube employed in FIG. 1.
Figure 8:
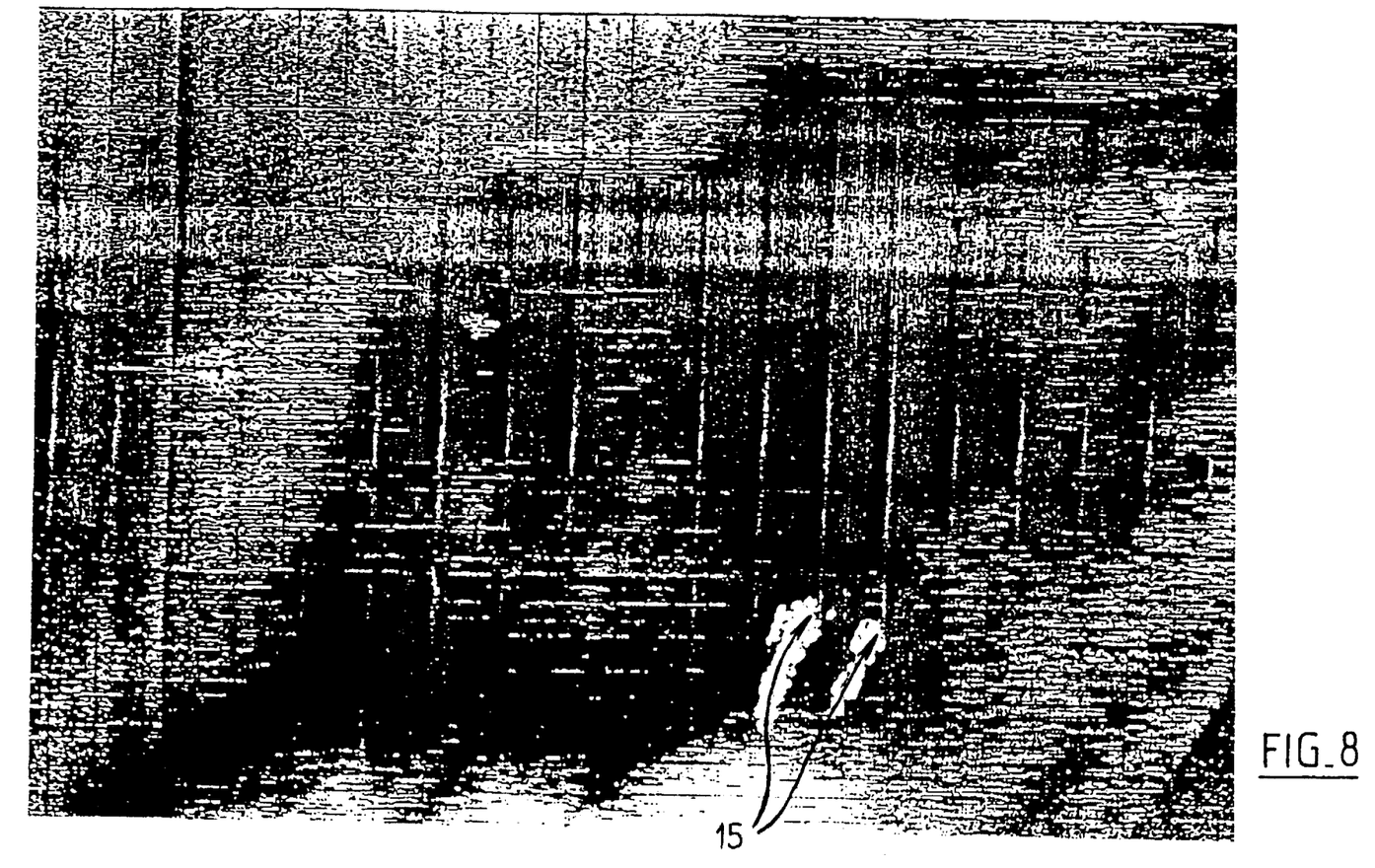
FIG. 8 is a time section obtained according to the invention for a seabed located at about 140 ms.
Figure 9:
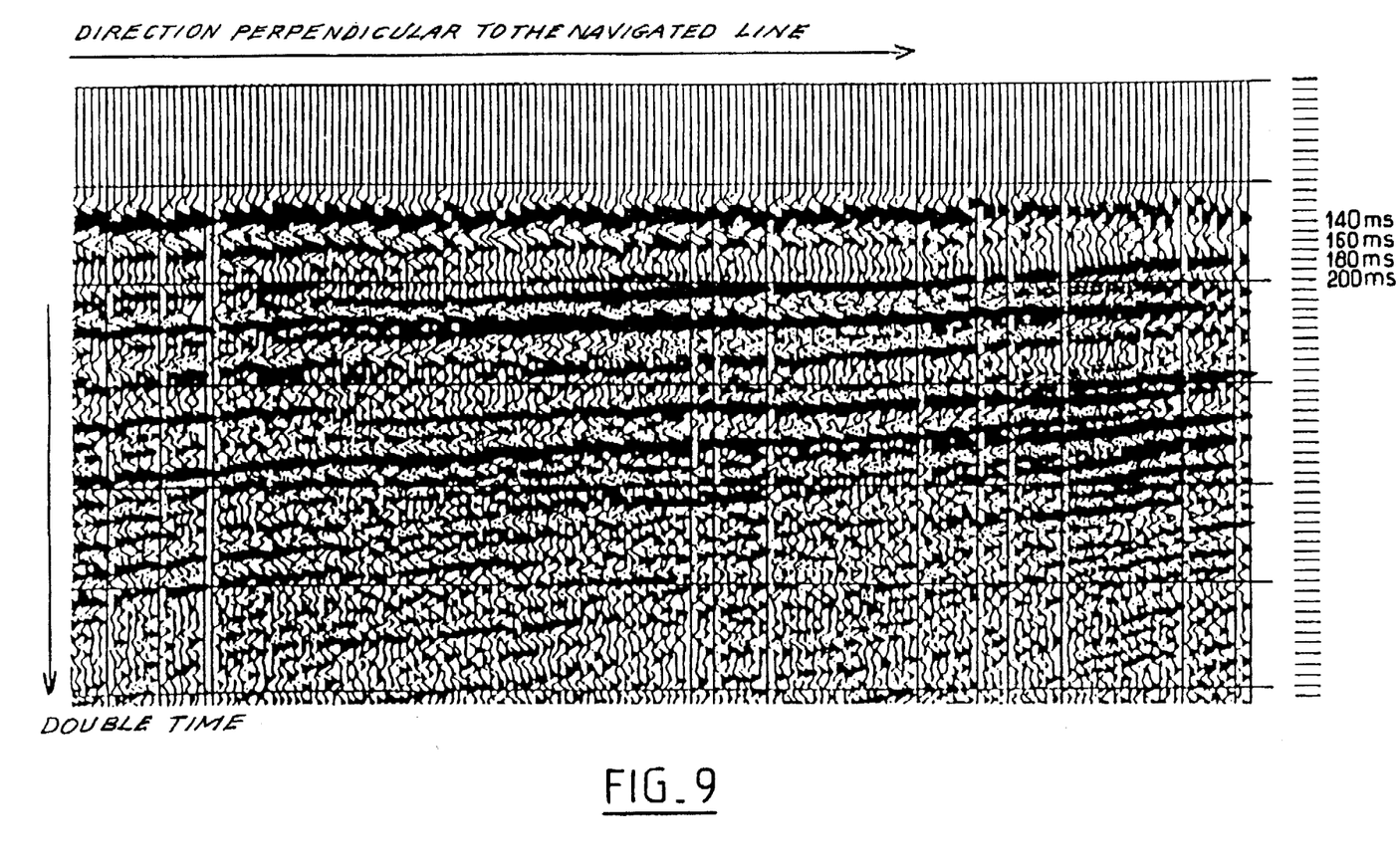
FIG. 9 is a time section in the cross-line direction to the ship's path obtained with the method of the invention.

A comparison of FIGS. 8 and 9, which are sections of the near trace 3-D cube of the invention, with FIGS. 1 and 2 of the prior art helps to verify that the bands 15 of the artifacts (FIG. 8) are considerably broadened and that the first subsurface layers are better plotted on the near trace 3-D cube obtained by the invention, even if the sections shown in the figures do not concern the same areas surveyed and are at different constant times. FIG. 9 shows that the traces are more legible and more clearly distinguished from each other, which makes it easier to identify positioning errors.

FIGS. 4 to 7 show the frequency distortion curves, in which the variation is substantially linear as a function of the offset for the range of values (offset, time, velocity) considered.

Figure 4:
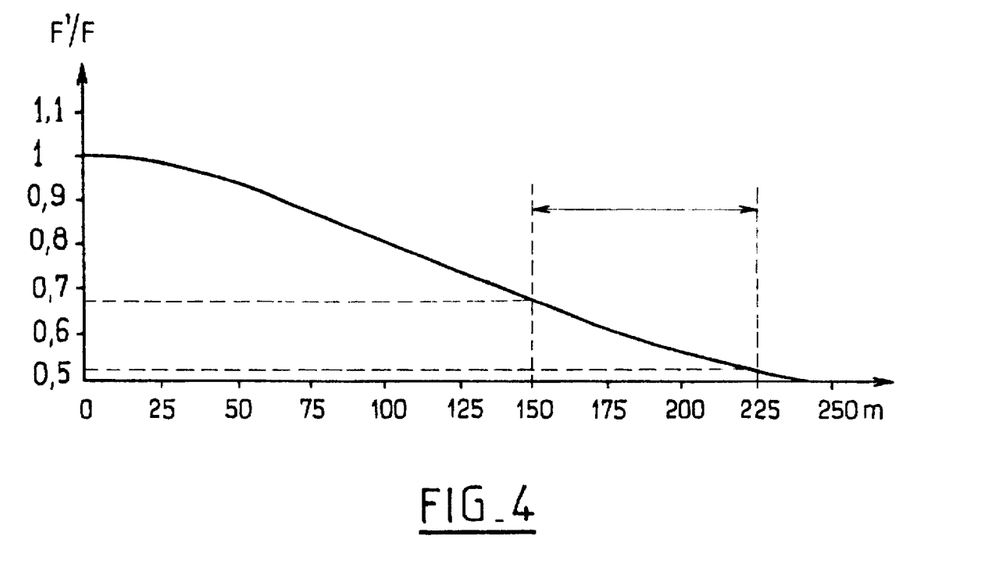
FIGS. 4 to 7 are curves illustrating frequency distortion occurrences due to normal moveout as a function of offset.

FIG. 4 shows a curve F/F as a function of offset with $T_0=92$ ms, a maximum offset of 250 m and an NMO (normal moveout) of 1500 m/s. The variation in the ratio F/F is in the range between 0.525 and 0.675 or 0.15 for a variation in offset of between 150 and 225. The method of the invention helps to reduce the variation of the ratio F/F to a value substantially equal to 0.025, corresponding to a gain of about 6.

Figure 5:
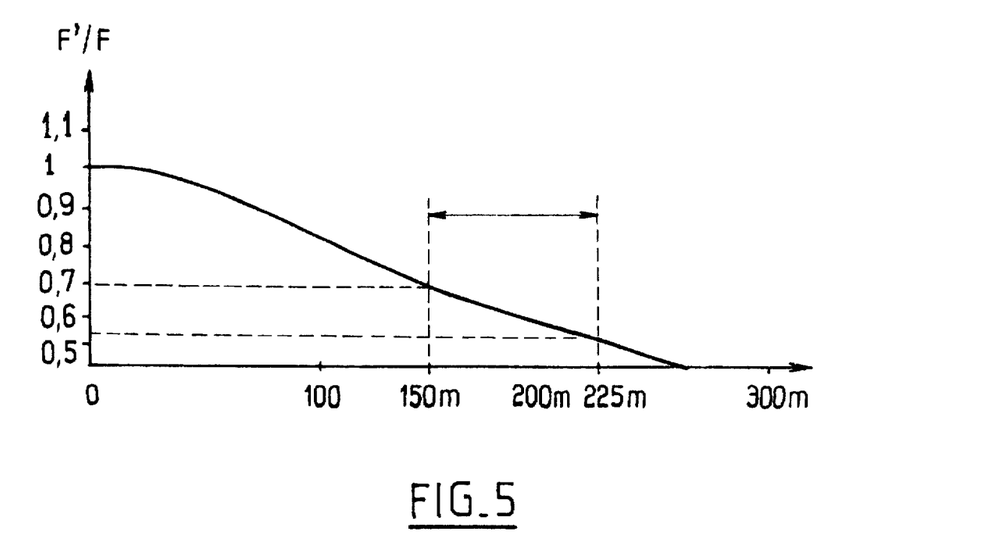
Figure 6:
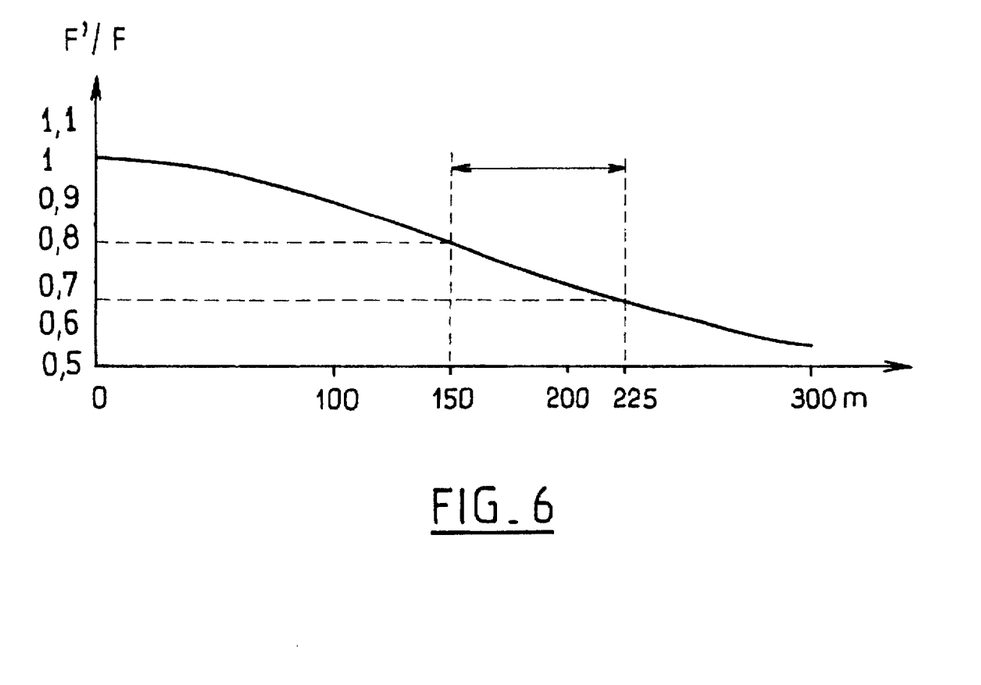
Figure 7:
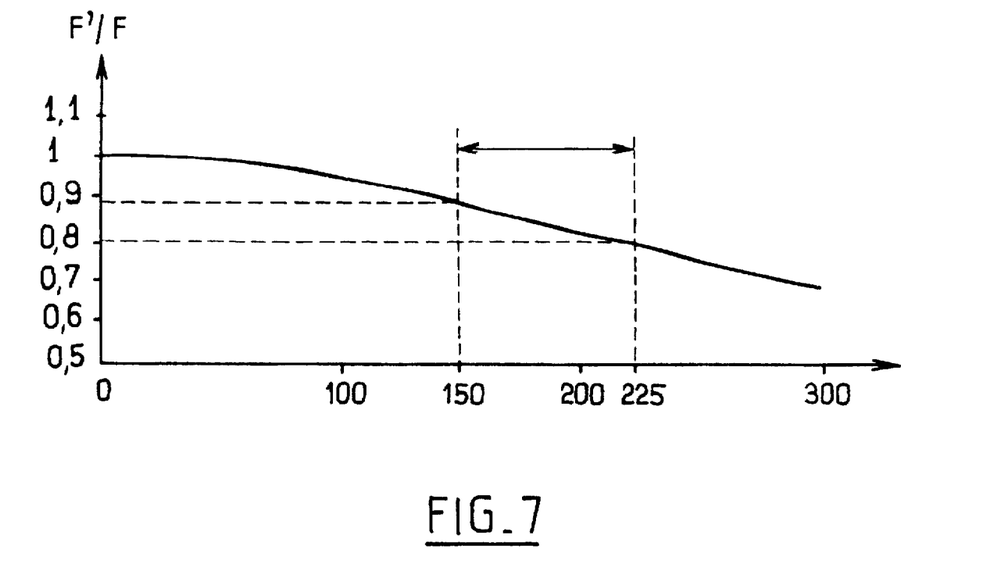

FIG. 5 shows the curve F/F as a function of offset with $T_0=92$ ms, NMO velocity=1600 m/s and a maximum offset of 300 m, while FIG. 6 shows a similar curve with $T_0=124$ ms, NMO velocity=1600 m/s and a maximum offset of 300 m. The curve in FIG. 7 is plotted with $T_0=172$ ms, NMO velocity=1700 m/s and a maximum offset of 300 m. In all cases and in the linear portion of each F/F curve, a gain of about 6 can be observed.

The method of the invention is also applicable in reduced multiple coverage. For this purpose, each bin, in addition to a first trace, such as the one associated with the midpoints PM and $PM_1$, is assigned at least a second additional trace which serves to constitute said reduced multiple coverage. Each additional trace can be either a trace selected as the first trace but with a different constant offset, or a consecutive trace to said first trace. In this case, the traces thus selected, including the first trace, receive the NMO correction, and are stacked to obtain a stack trace which is used as the central trace of the bin in which the midpoints associated with the traces selected are located.

The current trend is to increase the number of streamers: this accordingly increases the differences between short offsets of the same navigated line, and potentially aggravates the differential frequency distortion affecting the constant-offset traces. With the method of the invention, and irrespective of the coverage mode, single or multiple, the increase in the number of streamers has practically no effect on the differential frequency distortion because it involves working with a constant or virtually constant offset in single coverage and a range of constant offsets in multiple coverage.

We claim:

1. A method for making a 3-D cube of near traces from data acquired in a marine reflection seismic survey, comprising the steps of:
    a) displacing along a navigated line extending along a reference direction,
        i) at least one emission source, and
        ii) a plurality of streamers spaced from said emission source, the streamers being laterally spaced from each other and each streamer carrying receivers/recorders uniformly spaced along a length dimension of each said streamer, and
        iii) means for locating the spatial location of each source and each receiver/recorder, said means delivering space locating data related to positions of each source and of each receiver/recorder,
    b) generating seismic signals from said at least one emission source,
    c) detecting and recording in said receivers/recorders said seismic signals as traces along a number of acquisition lines which extend substantially parallel to the reference direction, the number of acquisition lines being equal to the product of the number of streamers and the number of sources used; using said seismic signals to determine an acquisition plane; each said trace being associated with a pair comprising a source and a receiver/recorder which are separated by an offset and has a source to receiver/recorder midpoint associated therewith,
    d) determining from said space locating data the offset and midpoint corresponding to each trace,
    e) forming a regular grid in an X, Y plane in a system of X, Y, T axes, said regular grid forming a group of bins, and said X, Y plane being representative of said acquisition plane,
    f) producing for each bin a central trace from at least a first recorded trace of which the associated midpoint is located in said bin and of which the offset substantially corresponds to a given constant offset that is equal to the smallest offset common to at least the traces of the acquisition lines along said at least one navigated line, and
    g) assigning said central trace to the center of said bin along the time axis (T), thereby forming a 3-D cube.

2. The method according to claim 1, wherein the smallest common offset is equal to the largest of short offsets associated with said at least one navigated line.

3. The method according to claim 1, wherein said central trace consists exclusively of said first trace in order to obtain a near trace 3-D cube in unit coverage.

4. The method according to claim 1, wherein in addition to said first trace at least one additional trace is assigned to each bin, said additional trace having a midpoint in said bin and being selected from a trace having a constant offset different from the offset of said first trace, and a trace consecutive to said first trace, said first trace and said additional trace being corrected for normal moveout, said corrected traces being stacked for obtaining a stack trace which is used as the central trace of the bin.

5. The method according to claim 2, wherein said central trace consists exclusively of said first trace in order to obtain a near trace 3-D cube in unit coverage.

6. The method according to claim 2, wherein in addition to said first trace at least one additional trace is assigned to each bin, said additional trace having a midpoint in said bin and being selected from a trace having a constant offset different from the offset of said first trace, and a trace consecutive to said first trace, said first trace and said additional trace being corrected for normal moveout, said corrected traces being stacked for obtaining a stack trace which is used as the central trace of the bin.

* * * * *